(12) United States Patent
Wylie et al.

(10) Patent No.: US 11,151,628 B2
(45) Date of Patent: Oct. 19, 2021

(54) PROXIMITY-BASED VEHICLE COMPARISON

(71) Applicant: Capital One Services, LLC, McLean, VA (US)

(72) Inventors: Stephen Wylie, McLean, VA (US); Staevan Duckworth, McLean, VA (US); Qiaochu Tang, McLean, VA (US); Geoffrey Dagley, McLean, VA (US); Olalekan Awoyemi, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 6 days.

(21) Appl. No.: 16/290,607

(22) Filed: Mar. 1, 2019

(65) Prior Publication Data

US 2020/0279314 A1 Sep. 3, 2020

(51) Int. Cl.
*G06Q 30/00* (2012.01)
*G06Q 30/06* (2012.01)
(Continued)

(52) U.S. Cl.
CPC ....... *G06Q 30/0629* (2013.01); *G06F 3/0482* (2013.01); *G06F 3/04847* (2013.01);
(Continued)

(58) Field of Classification Search
CPC . G06Q 30/0601–0645; G06Q 30/0629; G06Q 30/0627; G06Q 30/0643; G06Q 30/0625; G06Q 30/02; G06F 3/011; G06F 3/0425; G06F 3/0482; G06F 3/04847; G06K 9/00288; H04W 4/023

See application file for complete search history.

(56) References Cited

U.S. PATENT DOCUMENTS 6,654,070 B1 11/2003 Rofe
8,606,430 B2 12/2013 Seder et al.
(Continued)

OTHER PUBLICATIONS

"Chaney, Paul, '15 Ways Small Businesses Can Use Beacons and Geofencing to Attract and Retain Customers', Jan. 4, 2017, Small Business Trends, pp. 1-5" (Year: 2017).*
(Continued)

*Primary Examiner* — William J Allen
*Assistant Examiner* — Maria S. P. Heath
(74) *Attorney, Agent, or Firm* — Harrity & Harrity, LLP

(57) ABSTRACT

A device may determine that a user device, associated with a user, and a first object for comparison are within a threshold proximity of one another. The device may communicate with the user device to obtain a comparison profile, associated with the user, based on determining that the user device and the first object are within the threshold proximity of one another. The device may identify, based on the comparison profile, a set of desired attributes. The device may identify, based on the comparison profile, a set of attribute categories to be used to compare the first object and the set of desired attributes. The device may determine a first set of attributes of the first object for the set of attribute categories. The device may present, for display, information that identifies one or more attributes of the first set of attributes or the set of desired attributes.

20 Claims, 8 Drawing Sheets

(51) Int. Cl.
  *H04W 4/02* (2018.01)
  *G06F 3/0482* (2013.01)
  *G06F 3/0484* (2013.01)
  *G06K 9/00* (2006.01)

(52) U.S. Cl.
  CPC ..... *G06K 9/00288* (2013.01); *G06Q 30/0627* (2013.01); *G06Q 30/0643* (2013.01); *H04W 4/023* (2013.01)

(56) References Cited

U.S. PATENT DOCUMENTS

| | | | |
|---|---|---|---|
| 9,292,565 B2* | 3/2016 | Bhagwan | G06K 9/18 |
| 9,799,065 B1* | 10/2017 | Domer | G06Q 30/0631 |
| 2002/0077931 A1* | 6/2002 | Henrion | G06Q 30/02 707/713 |
| 2006/0145825 A1 | 7/2006 | McCall | |
| 2013/0006775 A1 | 1/2013 | Jordan et al. | |
| 2013/0307706 A1 | 11/2013 | Kriezman | |
| 2014/0092058 A1 | 4/2014 | Ziao | |
| 2014/0152847 A1* | 6/2014 | Zomet | G06Q 30/0629 348/207.1 |
| 2015/0371579 A1 | 12/2015 | Yu | |
| 2016/0023665 A1* | 1/2016 | Sherony | B60W 50/12 701/2 |
| 2016/0179276 A1 | 6/2016 | Nathan | |
| 2017/0372402 A1* | 12/2017 | Levy | G06Q 30/0631 |

OTHER PUBLICATIONS

Samuel Axon, "Sony's projector that turns your surface into a touchscreen is now available", ars Technica, https://arstechnica.com/gadgets/2017/10/sonys-projector-that-turns-your-wall-into-a-touchscreen-is-now-available/, Oct. 12, 2017.
Cars.com, "Compare Cars Side-by-Side", https://www.cars.com/research/compare/, Jan. 4, 2007, 2 pages.
Spacee, "Interactive Vehicle", http://www.spacee.co/TouchCar/InteractiveVehicle, Oct. 19, 2017, 3 pages.
Spacee, "Virtual Test Drive", http://www.spacee.co/VirtualTestDrive, Oct. 19, 2017, 3 pages.

* cited by examiner

PROXIMITY-BASED VEHICLE COMPARISON

BACKGROUND

Comparison shopping may be used to filter and compare products based on price, features, reviews, and other criteria. A consumer may use comparison shopping to find products and services that match the needs of the consumer.

SUMMARY

In some implementations, a method may include determining, by a device, that a user device and a first vehicle for comparison are within a threshold proximity of one another; obtaining, by the device, a comparison profile associated with the user device based on determining that the user device and the first vehicle are within the threshold proximity of one another; identifying, by the device and based on the comparison profile, a second vehicle to be compared with the first vehicle; identifying, by the device and based on the comparison profile, a set of attribute categories to be used to compare the first vehicle and the second vehicle; determining, by the device, a first set of attributes of the first vehicle for the set of attribute categories; determining, by the device, a second set of attributes of the second vehicle for the set of attribute categories; and outputting, by the device, information that identifies one or more attributes of the first set of attributes or the second set of attributes for presentation on the first vehicle or an image of the first vehicle.

In some implementations, a device may include one or more memories and one or more processors communicatively coupled to the one or more memories. The one or more processors may be configured to determine that a user device, associated with a user, and a first object for comparison are within a threshold proximity of one another; communicate with the user device to obtain a comparison profile, associated with the user, based on determining that the user device and the first object are within the threshold proximity of one another; identify, based on the comparison profile, a set of desired attributes; identify, based on the comparison profile, a set of attribute categories to be used to compare the first object and the set of desired attributes; determine a first set of attributes of the first object for the set of attribute categories; and present, for display, information that identifies one or more attributes of the first set of attributes or the set of desired attributes.

In some implementations, an interactive display system may be associated with a first vehicle. The interactive display system may include one or more memories and one or more processors communicatively coupled to the one or more memories. The one or more processors may be configured to detect a set of vehicles that are within a threshold distance of the first vehicle; receive input that identifies a second vehicle included in the set of vehicles; receive input that identifies a set of attribute categories to be used to compare the first vehicle and the second vehicle; determine a first set of attributes of the first vehicle for the set of attribute categories; determine a second set of attributes of the second vehicle for the set of attribute categories; and output, for display, information that identifies one or more attributes of the first set of attributes or the second set of attributes.

DETAILED DESCRIPTION

The following detailed description of example implementations refers to the accompanying drawings. The same reference numbers in different drawings may identify the same or similar elements.

When shopping for large, expensive items or objects in person, it may be difficult for a shopper to directly compare attributes or features of those items, especially when the items are complex machines that include a lot of parts, such as vehicles (e.g., cars, trucks, boats, motorcycles, airplanes, and/or the like), appliances, electronics, and/or the like. A seller may include a sticker or other document on such an item so that a shopper can read all of the features of the item. However, this can be overwhelming, as complex items like vehicles include a lot of features. Furthermore, this does not permit easy comparison between different items regarding features that are important to the shopper, or between items that are placed apart from one another. In some cases, a shopper may use a website to assist with such comparison shopping. However, when items are shopped for in person, the shopper may not know whether an item on the website is the same as the item that the shopper is looking at in a physical location, or may not know whether the item is in stock in the physical location.

Some systems and methods described herein use proximity-based techniques to obtain relevant information for performing a comparison of items (e.g., items for sale, rent, lease, and/or the like) that are physically located near a shopper. In some cases, comparison information may be output for presentation on an item being shopped for, such as a vehicle, or on an image of the item being shopped for (e.g., using augmented reality). In this way, a shopping experience may be enhanced. In some cases, the systems and methods described herein may use stored information associated with a shopper, which may be input at a different time and place, to output the comparison information for presentation on the item. In this way, processing resources may be conserved by eliminating the need to input such information multiple times, reducing the amount of information that needs to be input at the physical location of the item being shopped for, and/or the like. Furthermore, in some cases, the systems and methods described herein may automatically detect items for comparison that are near an item that is near the shopper, thereby conserving processing resources that would otherwise be needed to input such information, and increasing accuracy such that data regarding nearby items are updated in real-time (e.g., if an item, such as a vehicle, is moved, taken for a test drive, sold, and/or the like).

Figure 1:
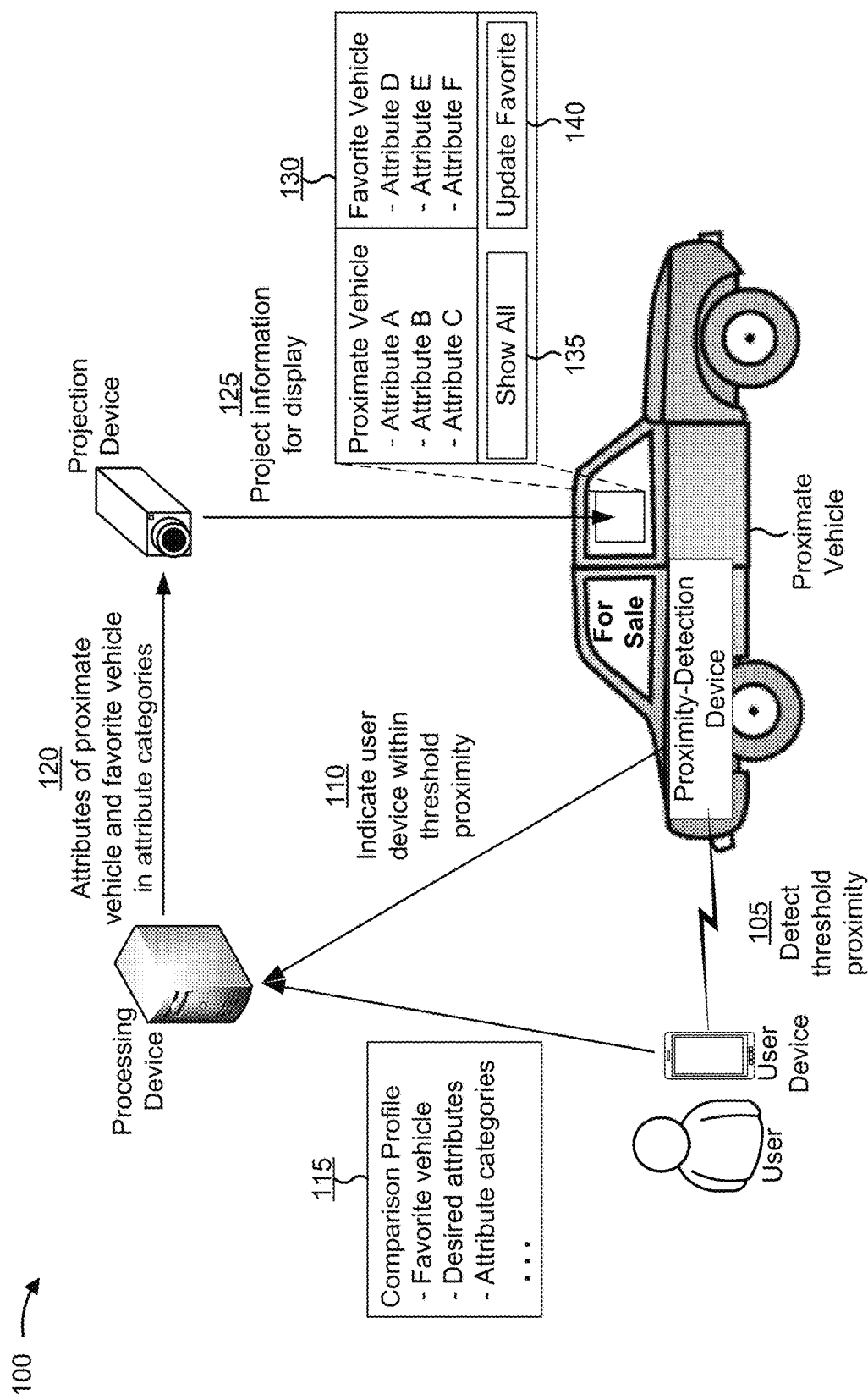
FIGS. 1-3 are diagrams of example implementations described herein.

FIG. 1 is a diagram of an example implementation 100 described herein. As shown in FIG. 1, example implementation 100 may include a user device (e.g., a smart phone, a tablet, and/or the like), a processing device (e.g., a server that performs processing to determine information to be presented for display), a projection device or a display device (e.g., shown as a projector, but which could be a display, such as an interactive display device, or another type of device capable of presenting information for display), a vehicle physically located near the user device (e.g., shown as "proximate vehicle"), and a proximity-detection device associated with the vehicle (e.g., capable of detecting presence of the user device when the user device is located near the vehicle, such as by using a sensor, a personal area network like Bluetooth, and/or the like). Although some implementations are described herein in connection with proximity-based comparison of vehicles, some implementations may by applied to objects or items other than vehicles, such as appliances, furniture, electronics, and/or the like. Furthermore, while some implementations are described herein in connection with selling or buying an object or item, some implementations may be applied to renting an object or item, leasing an object or item, and/or the like.

As shown by reference number 105, the proximity-detection device may detect that a user device is within a threshold proximity (e.g., distance) of the proximity-detection device. For example, the proximity-detection device may detect that the user device is within a communicative proximity of the proximity-detection device, meaning that the proximity-detection device can detect the user device using a communication protocol, such as a protocol of a personal area network (PAN) (e.g., Bluetooth, Bluetooth Low Energy (BLE), Zigbee, and/or the like), a near-field communication (NFC) protocol, a radio frequency identification (RFID) network, and/or the like. In some implementations, the threshold proximity may be around 10 meters or less (e.g., for Bluetooth and/or the like), may be around 1 meter or less (e.g., for NFC), and/or the like. In this way, the likelihood that information is displayed in associated with a vehicle that a user is looking at and/or interested in may be increased. Additionally, or alternatively, such likelihood may be increased by outputting a prompt on the user device and receiving user input from the user device (e.g., both of which may be accomplished by communications between the processing device and the user device). The user input may indicate whether the user is looking at and/or interested in the proximate vehicle. Additionally, or alternatively, facial recognition may be used to detect a direction in which the user is looking.

In some implementations, the user device may receive and/or obtain a list of proximity-detection device identifiers (e.g., network identifiers) associated with a geographic area (e.g., a geofence). For example, the user device may receive a notification upon entering the geographic area. The notification may indicate that information regarding proximity-detection device and/or proximate vehicles is available, and may prompt a user to provide input to permit such information to be downloaded by the user device. Upon receiving such user input, the user device may obtain the list of proximity-detection device identifiers. The user device may use the list of proximity-detection device identifiers to determine when the user device is within communicative proximity of a proximity-detection device having a proximity-detection device identifier included in the list.

In some implementations, a proximity-detection device may differentiate a user device from other proximity-detection devices in the vicinity of the proximity-detection device to determine that the proximity-detection device and the user device are within communicative proximity. For example, each proximity-detection device may transmit an indicator (e.g., a flag, a value in a field of a header, and/or the like) when transmitting a network identifier and/or other information used to identify the proximity-detection device on a network (e.g., a PAN and/or the like). In this case, if a proximity-detection device detects the indicator (e.g., a particular bit value of the indicator), then the proximity-detection device may determine that the device from which a network identifier is received is a proximity-detection device, and not a user device. If a proximity-detection device does not detect the indicator, then the proximity-detection device may determine that the device from which a network identifier is received is a user device, and not a proximity-detection device. Additionally, or alternatively, the proximity-detection device may use statistical modeling to determine a list of network identifiers of other proximity-detection device(s) that are typically in the vicinity of the proximity-detection device. If the proximity-detection device detects a network identifier that is not included in the list, then the proximity-detection device may determine that the network identifier is associated with a user device, and that the user device is within communicative proximity of the proximity-detection device.

As shown by reference number 110, the proximity-detection device may transmit an indication that the user device is within the threshold proximity of the proximity-detection device. As shown, this indication may be transmitted to a processing device responsible for obtaining and/or processing relevant information for performing a comparison between vehicles. In some implementations, the processing device may be located within the vehicle. Alternatively, the processing device may be centrally located (e.g., at a car dealership), and may communicate with one or more proximity-detection devices associated with multiple vehicles (e.g., a single proximity-detection device associated with multiple vehicles, or multiple proximity-detection devices corresponding to the multiple vehicles). Based on the indication, the processing device may determine that a user device is within a threshold proximity of the vehicle and/or the proximity-detection device associated with the vehicle. In some implementations, the user device may provide a proximity-detection device identifier to the processing device, which may be used by the processing device to identify the proximity-detection device and/or the proximate vehicle within proximity of the user device. In some implementations, the indication may include information that identifies the user device, such as a network address and/or identifier used for communication via a PAN, a phone number of the user device, a credential provided by the user device and/or input by a user of the user device, and/or the like. The proximity-detection device may obtain such information from the user device (e.g., with consent of the user), and may transmit such information to the processing device to permit the processing device to identify the user device and/or a comparison profile of a user of the user device.

Although techniques are described above in connection with the proximity-detection device detecting the user device and transmitting an indication to the processing device, in some implementations, the user device may detect the proximity-detection device and may transmit the indication to the processing device. Furthermore, while detection of a user device within proximity of the proximity-detection device is described above as the trigger for obtaining a comparison profile, other triggers may be used, in some implementations. For example, a facial recognition device may be used to detect a user in proximity of the proximate vehicle, and to identify and obtain a comparison profile associated with the user. Additionally, or alternatively, the user may interact with a fingerprint scanner or other biometric device, and such interaction may be used to identify and obtain a comparison profile associated with the user.

As shown by reference number 115, the processing device may obtain a comparison profile associated with the user device. The comparison profile may be obtained based on determining that the user device and the vehicle are within the threshold proximity of one another, to avoid wasting computing resources and network resources by obtaining the comparison profile when the user is not likely to be looking at the vehicle. Additionally, or alternatively, the comparison profile may be obtained using facial recognition to identify the user. As shown, the comparison profile may identify a favorite vehicle of the user, against which other vehicles are to be compared. As used herein, the proximate vehicle may be referred to as a first vehicle, and the favorite vehicle may be referred to as a second vehicle. Additionally, or alternatively, the comparison profile may identify a set of desired attributes associated with the user. In some implementations, the set of desired attributes may be input by the user. Additionally, or alternatively, the set of desired attributes may be determined from the attributes of the favorite vehicle. In some implementations, the set of desired attributes may be used to determine the favorite vehicle (e.g., by identifying a vehicle that matches the greatest number of desired attributes, the most important desired attributes as indicated by attribute categories, and/or the like).

Additionally, or alternatively, the comparison profile may identify a set of attribute categories to be used to compare the proximate vehicle and the favorite vehicle (and/or to compare attributes of the proximate vehicle to the set of desired attributes). In some implementations, the user may interact with the user device or another user device to input information identifying the user's favorite vehicle, the set of desired attributes, and/or the set of attribute categories that are important to the user (e.g., via a website, an application, and/or the like).

Additionally, or alternatively, the comparison profile may identify pricing parameters associated with the user, such as an interest rate offered to the user (e.g., based on the user being prequalified for a purchase and/or inputting information to determine the interest rate), a down payment to be paid by the user (e.g., which may be input by the user), a value of a trade-in vehicle to be traded in by the user (e.g., based on information about the trade-in vehicle input by the user, stored information identifying trade-in values for vehicles with various makes, models, years, mileages, conditions, and/or the like), and/or the like. In some implementations, the processing device may calculate payment information based on one or more pricing parameters, and the payment information and/or a pricing parameter may be included as an attribute. For example, the processing device may calculate payment information such as a monthly payment, an overall amount to be paid, an amount of principal to be paid, an amount of interest to be paid, and/or the like (e.g., based on the interest rate offered to the user, a down payment, a trade-in value, and/or the like).

In some implementations, the processing device may receive the comparison profile from the user device. For example, the user device may store the comparison profile, or may obtain the comparison profile (e.g., from a storage system), and may transmit the comparison profile to the processing device (e.g., based on a request from the processing device, based on acceptance of such transmission indicated by the user, and/or the like). Additionally, or alternatively, the processing device may receive the comparison profile from a storage system (e.g., a server) that stores the comparison profile. In this case, the processing device may obtain a credential from the user device, and may transmit the credential to the storage system. The storage system may verify that credential and transmit the comparison profile to the processing system.

In some implementations, the favorite vehicle may be identified, for example, by a make of the vehicle (e.g., a manufacturer), a model of the vehicle, a trim package of the vehicle (e.g., identifying one or more attributes, features, upgrades, and/or the like of the vehicle), a year of the vehicle (e.g., a model year, a year of manufacture, and/or the like), and/or the like. An attribute category may include any category that can be used to identify an attribute of a vehicle, such as the year, trim package, engine attributes (e.g., horsepower, torque, number of cylinders, and/or the like), transmission attributes (e.g., number of gears, speeds, and/or the like), interior attributes (e.g., seat material, seat color, entertainment packages, cargo capacity, and/or the like), color, price (e.g., an overall price, a down payment required to purchase, a monthly payment, an interest rate, payment information, and/or the like), and/or the like.

As shown by reference number 120, the processing device may determine attributes of the proximate vehicle and the favorite vehicle, and may output information identifying one or more of those attributes for presentation. In some implementations, the processing device may identify and/or output only those attributes associated with the identified set of attribute categories, thereby conserving computing resources and/or network resources. The processing device may store information regarding vehicles so that the attributes can be searched for and/or identified, and/or may request the attributes from a storage system that stores such information. Thus, the processing device may determine a first set of attributes of the proximate vehicle for the set of attribute categories, may determine a second set of attributes of the favorite vehicle for the set of attribute categories, and may output information that identifies one or more attributes of the first set of attributes and the second set of attributes.

In some implementations, information that identifies the one or more attributes may be output to a projection device for presentation on the first vehicle. Additionally, or alternatively, this information may be output to a display associated with the processing device, such as an interactive display device (e.g., which may be affixed to the proximate vehicle), a display near the proximate vehicle, and/or the like. Additionally, or alternatively, this information may be output to the user device for presentation on an augmented reality user interface, which may overlay the information over an image of the proximate vehicle captured by the user device. In some implementations, the processing device may only output information for the attributes categories, thereby conserving network resources and memory and/or processing resources of the device(s) that receive the information. In some implementations, the processing device may identify information for more attribute categories than the identified attribute categories, and may output such information to the device(s) that receive the information. In this way, the presented information can be updated quickly (e.g., if the user inputs information indicating the desire to view information from additional categories).

As shown by reference number 125, the projection device may output the information that identifies the one or more attributes for presentation on the proximate vehicle. In some implementations, the information may be output to an interactive display of the proximate vehicle, such a film or decal adhered to a window of the proximate vehicle. In some implementations, the projection device may be capable of detecting an interaction with the interactive display (e.g., by detecting motion, shadows, and/or the like) by the user. Additionally, or alternatively, the interactive display may include an interactive display screen (e.g., a touch screen and/or the like). The interactive display screen may be affixed to the vehicle, or may be located near the vehicle.

In some implementations, the processing device may output (e.g., to a backend system associated with a car dealership) information associated with a number of user devices detected by different proximity-detection devices. This information may be used to determine which vehicles are most popular, which areas of a car dealership have the most users, and/or the like. In some implementations, the backend system may provide a recommendation based on this information, such as a recommendation to move a vehicle with a threshold level of popularity (e.g., a threshold number of user devices within the vicinity) to a particular location, to bring popular vehicles together, to space popular vehicles apart, and/or the like.

As shown by reference number 130, the information output by the projection device may be provided for display on a user interface of the interactive display. As shown, the information may be display in a manner that permits side-by-side comparison of attributes that are important to the user (e.g., as indicated in the set of attribute categories). In some implementations, the one or more attributes may include only corresponding attributes (e.g., attributes in a same attribute category) that differ between two sets of attributes. For example, the one or more attributes may include corresponding attributes that are different between the first set of attributes (e.g., of the proximate vehicle) and the second set of attributes (e.g., of the favorite vehicle). Additionally, or alternatively, the one or more attributes may include attributes of the proximate vehicle that do not match any attributes in the set of desired attributes. Additionally, or alternatively, the one or more attributes may include attributes of the proximate vehicle that match an attribute in the set of desired attributes. In some implementations, the user may interact with the user interface to indicate the one or more attributes to be displayed (e.g., by selecting one or more options to display attributes that are different between sets, that are the same between sets, that do not match desired attributes, that match desired attributes, and/or the like). In some implementations, an attribute may be presented for display in association with a price of that attribute.

In some implementations, the projection device may modify the presented attributes based on detecting an interaction with the user interface. For example, as shown by reference number 135, the user may interact with the user interface to cause all attributes to be provided for display. Additionally, or alternatively, the user may interact with the user interface to cause one or more attributes to be hidden (e.g., by swiping an attribute). In some implementations, interaction with an attribute associated with one of the vehicles may cause a corresponding action to occur for a corresponding attribute of the other vehicle. For example, if the user requests that a price of the proximate vehicle be displayed (or hidden), the price of the favorite vehicle may also be displayed (or hidden).

As shown by reference number 140, the user interface may provide an input mechanism that permits the user to request that the favorite vehicle of the user be updated to the proximate vehicle (e.g., in the comparison profile). The device that detects such interaction (e.g., which may be an interactive display screen, the projection device, the processing device, and/or the like) may transmit an instruction to mark the proximate vehicle as the favorite vehicle in the comparison profile, and to remove a corresponding indication associated with the vehicle that was previously the favorite vehicle. Thus, the comparison profile (e.g., which may be stored by the user device, a storage system, and/or the like) may be updated to replace the prior favorite vehicle (e.g., stored information associated with the prior favorite vehicle, such as vehicle attributes) with the proximate vehicle (e.g., information associated with the proximate vehicle, such as vehicle attributes) as the favorite vehicle. In some implementations, the comparison profile may store a history of favorite vehicles and transitions between those vehicles.

In some implementations, the projection device may stop outputting the information that identifies the one or more attributes. For example, the projection device may stop outputting the information based on a timer (e.g., which may start when the information is first output, may restart when the user interacts with the display, and/or the like). Additionally, or alternatively, the projection device may stop outputting the information based on receiving an indication that the user is no longer in proximity of the proximate vehicle. For example, the proximity-detection device and/or the user device may determine that the proximity-detection device and the user device are not within a threshold proximity (e.g., are not within communicative proximity) of one another, and may transmit a signal to the processing device indicating that the devices are no longer within the threshold proximity. The processing device may transmit, to the projection device, an indication that the user is no longer in proximity of the proximate vehicle. In this way, information may be kept private to the user (e.g., especially payment information, pricing parameters, and/or the like).

Although the user interface of FIG. 1 is shown as presenting comparison information that compares attributes of a first vehicle (e.g., a proximate vehicle) and a second vehicle (e.g., a favorite vehicle), in some implementations, the user interface may present comparison information that compares attributes of the first vehicle to a set of desired attributes. For example, the first vehicle may be associated with a first set of attributes, and the user interface may present (e.g., based on information received from the processing device) one or more attributes from the first set of attributes that match a corresponding one or more attributes of the set of desired attributes (e.g., within one or more attribute categories). Additionally, or alternatively, the user interface may present one or more attributes from the first set of attributes that do not match any attributes of the set of desired attributes.

By using proximity-based techniques to obtain relevant information for performing a comparison of an item (e.g., a vehicle) that is physically located near the user and outputting such information for presentation in association with the item, a user experience may be enhanced. In some cases, the comparison profile may include information input at a different time and place than a time and place when and where the user is shopping. This conserves processing resources by eliminating the need to input such information multiple times, reducing the amount of information that needs to be input at the physical location of the item being shopped for, and/or the like. Furthermore, automatically detecting an item that is near the user and retrieving information associated with that item conserves processing resources that would otherwise be needed to input such information, and increases accuracy such that nearby items are updated in real-time (e.g., if an item, such as a vehicle, is moved, taken for a test drive, sold, and/or the like).

As indicated above, FIG. 1 is provided merely as an example. Other examples may differ from what was described with regard to FIG. 1.

Figure 2:
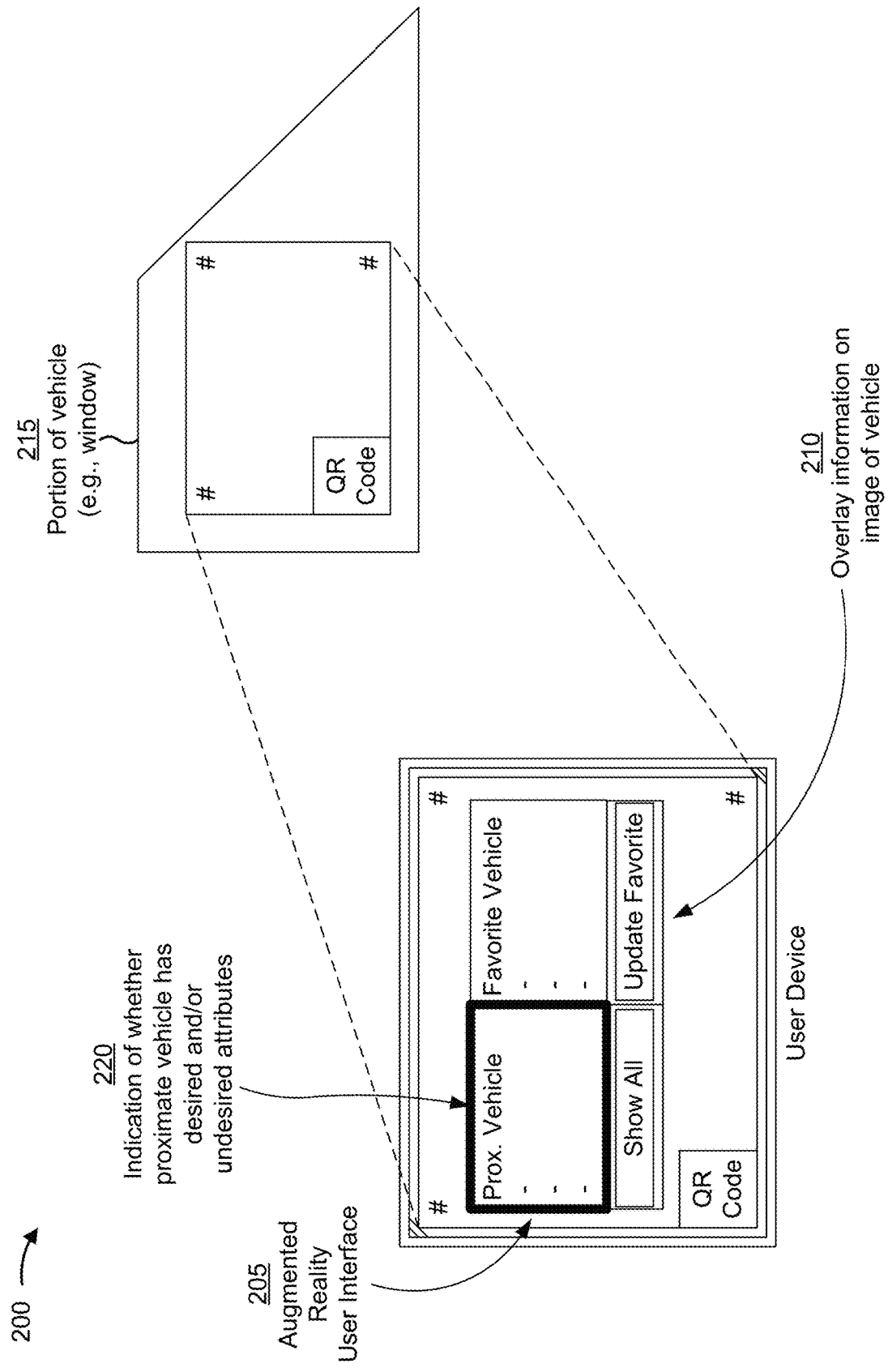

FIG. 2 is a diagram of another example implementation 200 described herein. As described above in connection with FIG. 1, in some implementations, information that identifies attributes for comparison may be projected onto an object in proximity of a user. Additionally, or alternatively, as shown by reference number 205, such information may be output on an augmented reality user interface. In this case, the information may be overlaid on an image of the vehicle, or a portion of the vehicle (e.g., a window, and/or the like) captured by the user device, as shown by reference number 210.

As shown by reference number 215, a tag may be affixed to the vehicle to assist with outputting information on the augmented reality user interface. For example, the tag may include a Quick Response (QR) code and/or the like, which may identify the proximate vehicle. In this case, the processing device and/or presentation device need not be involved in processing and/or presenting the information, thereby conserving device resources (e.g., processing resources, memory resources, and/or the like). For example, the user device may identify the proximate vehicle and/or obtain attributes of the proximate vehicle using the QR code (e.g., by requesting such information from a storage system). Additionally, or alternatively, the user device may identify the proximate vehicle and/or obtain attributes of the proximate vehicle using object recognition to identify the vehicle, a window or other body feature of the vehicle, an orientation of the vehicle, and/or the like. The user device may use this information to identify a location for the augmented reality user interface (e.g., on a window of the vehicle, a hood of the vehicle, and/or the like).

Additionally, or alternatively, the user device may obtain the comparison profile associated with the user (e.g., stored on the user device and/or a storage system accessible by the user device). The user device may perform one or more operations, described above in connection with FIG. 1 as being performed by the processing device, to identify appropriate attributes of the proximate vehicle and the favorite vehicle. The user device may overlay such information on a captured image of the vehicle. In some implementations, the tag affixed to the vehicle may have one or more markings (shown as #) to assist the user device with placement of the information on the overlay of the image.

As shown by reference number 220, in some implementations the user device may output an indication of whether the proximate vehicle has one or more desired attributes and/or one or more undesired attributes associated with a comparison profile of the user. In some implementations, the desired attributes and/or the undesired attributes may be directly indicated in the comparison profile. Additionally, or alternatively, the desired attributes may be extracted from information associated with the favorite vehicle (e.g., attributes of the favorite vehicle). In some implementations, the desired attributes and/or the undesired attributes may include attributes from only a set of attribute categories included in the comparison profile and/or identified as being important to the user.

In some implementations, the user device may determine whether the proximate vehicle has the one or more desired attributes. For example, the user device may determine whether the proximate vehicle has all of the desired attributes by comparing attributes of the proximate vehicle to the desired attributes (e.g., in the indicated attribute categories). In some implementations, if the proximate vehicle has all of the desired attributes, then the user device may output an indication that the proximate vehicle has all of the desired attributes (e.g., using text, color, a shape, a symbol, an icon, and/or the like). Additionally, or alternatively, if the proximate vehicle does not have all of the desired attributes, then the user device may output an indication that the proximate vehicle does not have all of the desired attributes. In some implementations, the user device may assign a score to the proximate vehicle based on the number of desired attributes that the proximate vehicle has, and may output an indication of the score.

Additionally, or alternatively, the user device may determine whether the proximate vehicle has one or more undesired attributes. For example, the user device may determine whether the proximate vehicle has any of the undesired attributes by comparing attributes of the proximate vehicle to the undesired attributes (e.g., in the indicated attribute categories). In some implementations, if the proximate vehicle has any of the undesired attributes, then the user device may output an indication that the proximate vehicle has an undesired attribute (e.g., using text, color, a shape, a symbol, an icon, and/or the like). Additionally, or alternatively, if the proximate vehicle does not have any of the undesired attributes, then the user device may output an indication that the proximate vehicle does not have any of the undesired attributes. In some implementations, the user device may assign a score to the proximate vehicle based on the number of undesired attributes that the proximate vehicle has, and may output an indication of the score. In this way, a user experience is enhanced, and processing resources are conserved, as described above in connection with FIG. 1.

Although some operations are described in connection with FIG. 2 as being performed by a user device, in some implementations one or more of these operations may be performed by another device, such as a processing device, a display device, and/or the like. For example, the processing device may determine whether the proximate vehicle has desired attributes or undesired attributes, and may output a corresponding indication (e.g., to a projection device, for projection on the proximate vehicle, and/or the like, as described above in connection with FIG. 1), as described above.

As indicated above, FIG. 2 is provided merely as an example. Other examples may differ from what was described with regard to FIG. 2.

Figure 3:
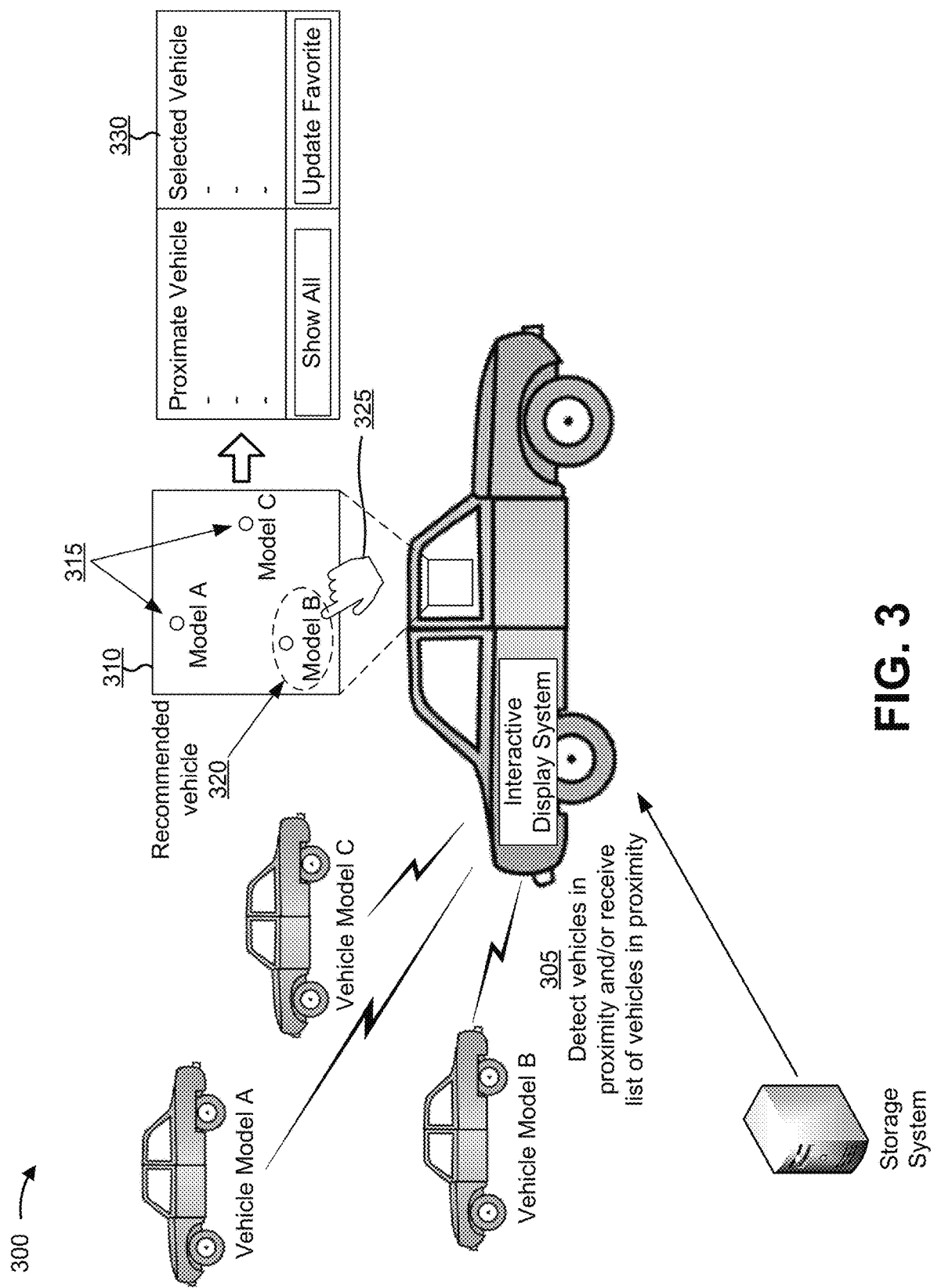

FIG. 3 is a diagram of another example implementation 300 described herein.

As shown by reference number 305, an interactive display system (e.g., which may include a processing device, a proximity-detection device, a display, and/or the like) may detect a set of vehicles within a threshold distance of a first vehicle (e.g., a proximate vehicle). For example, the interactive display system may detect that a proximity-detection device of the first vehicle is within a communicative proximity of one or more other proximity-detection devices corresponding to one or more other vehicles, in a similar manner as described above in connection with FIG. 1 (e.g., between a proximity-detection device and a user device). In some implementations, the proximity-detection device may provide information regarding such proximity to the interactive display system, and the interactive display system may use this information to determine other vehicles within a threshold distance and/or proximity of the first vehicle.

Additionally, or alternatively, the interactive display system may receive information that identifies a set of vehicles within a threshold distance of the first vehicle. For example, this information may be stored by a storage system associated with, for example, a car dealership, a car rental company, and/or the like. For example, the storage system may store a list of vehicles for a location (e.g., a dealership, a rental car company, a car lot, and/or the like), and the list may be provided to the interactive display system. In some implementations, the list may be populated, updated, and/or processed (e.g., by the storage system and/or the interactive display system) based on information that identifies vehicles within communicative proximity of one another, location information obtained from the vehicles (e.g., indicating global positioning system (GPS) coordinates), and/or the like. In some implementations, the interactive display system may receive information that identifies a set of vehicles that are within a threshold distance and that satisfy a threshold number of desired attributes associated with a user in proximity of the interactive display system. In the implementation where the interactive display system includes the user device, and information is displayed on an augmented reality user interface, the user device may receive the information described above.

As shown by reference number 310, the interactive display system may output information, for a user interface, based on determining vehicles within a threshold proximity of the first vehicle. As described above in connection with FIGS. 1 and 2, the user interface may be a user interface of a display device (e.g., an interactive display device), a user interface projected on the first vehicle, an augmented reality user interface, and/or the like.

As shown by reference number 315, the user interface may present (e.g., based on information from the interactive display system) a set of vehicle identifiers that identify the set of vehicles within proximity of the first vehicle. The vehicle identifiers in FIG. 3 are shown as circles, but other identifiers may be used (e.g., other shapes, icons, text, and/or the like).

As shown by reference number 320, in some implementations, the user interface may output information indicating a recommended vehicle for a user in proximity of the first vehicle. The proximity of the user and the first vehicle may be determined as described above in connection with FIG. 1. In some implementations, the interactive display system may determine the recommended vehicle based on a comparison profile associated with the user, which may be obtained as described above in connection with FIG. 1. For example, the interactive display system may determine a recommended vehicle, from the set of vehicles, that matches a favorite vehicle indicated in the comparison profile. Additionally, or alternatively, the interactive display system may determine a recommended vehicle, from the set of vehicles, that matches a greatest number of desired attributes indicated in the comparison profile (e.g., in attribute categories indicated in the comparison profile). Additionally, or alternatively, the interactive display system may determine a recommended vehicle, from the set of vehicles, that matches a fewest number of undesired attributes indicated in the comparison profile (e.g., in attribute categories indicated in the comparison profile). Additionally, or alternatively, the interactive display system may use a combination of these factors to determine a score for the vehicles in the set of vehicles, and may identify a recommended vehicle with the best score.

As shown by reference number 325, the interactive display system may receive input that identifies a second vehicle included in the set of vehicles. For example, the interactive display system may detect a user interaction (e.g., clicking, touching, swiping, and/or the like) with a vehicle identifier displayed on the user interface, and the vehicle identifier may represent the second vehicle. Additionally, or alternatively, the second vehicle may be determined based at least in part on a comparison profile. For example, the second vehicle may be the recommended vehicle determined as described above.

As shown by reference number 330, the interactive display system may output one or more attributes associated with the first vehicle (shown as proximate vehicle) and/or the second vehicle (shown as selected vehicle), as described elsewhere herein in connection with FIGS. 1 and 2. For example, the interactive display system may determine a set of attribute categories (e.g., from a comparison profile) to be used in association with a comparison for the first vehicle and/or the second vehicle, may determine a first set of attributes of the first vehicle for the set of attribute categories, and/or may determine a second set of attributes of the second vehicle for the set of attribute categories. The interactive display system may output one or more attributes of the first set of attributes or the second set of attributes, as described elsewhere herein (e.g., for a side-by-side comparison, corresponding attributes in the attribute categories, corresponding attributes that differ between sets, corresponding attributes that are the same between sets, attributes that match or do not match desired attributes, attributes that match or do not match undesired attributes, and/or the like).

In some implementations, an attribute may be presented for display in association with a price of that attribute. Additionally, or alternatively, a user may interact with the display to remove one or more attributes that are no longer desired by the user (e.g., based on a price of an attribute being too high). Thus, the user may interact with the interactive display system to customize a vehicle and/or indicate attributes that are important to the vehicle. In some implementations, such interaction (e.g., due to adding or removing attributes, updating a favorite vehicle, and/or the like) may cause the interactive display system to update a recommended vehicle, such as by outputting an indication that a different vehicle matches the user's desired attributes better than a previously recommended vehicle. In some implementations, the user interface may be updated to show the location of the different vehicle (e.g., with an indication for Model A or Model C, instead of Model B. In this way, the user may easily compare vehicle attributes and identify a vehicle that matches the user's preferences.

As indicated above, FIG. 3 is provided merely as an example. Other examples may differ from what was described with regard to FIG. 3.

Figure 4:
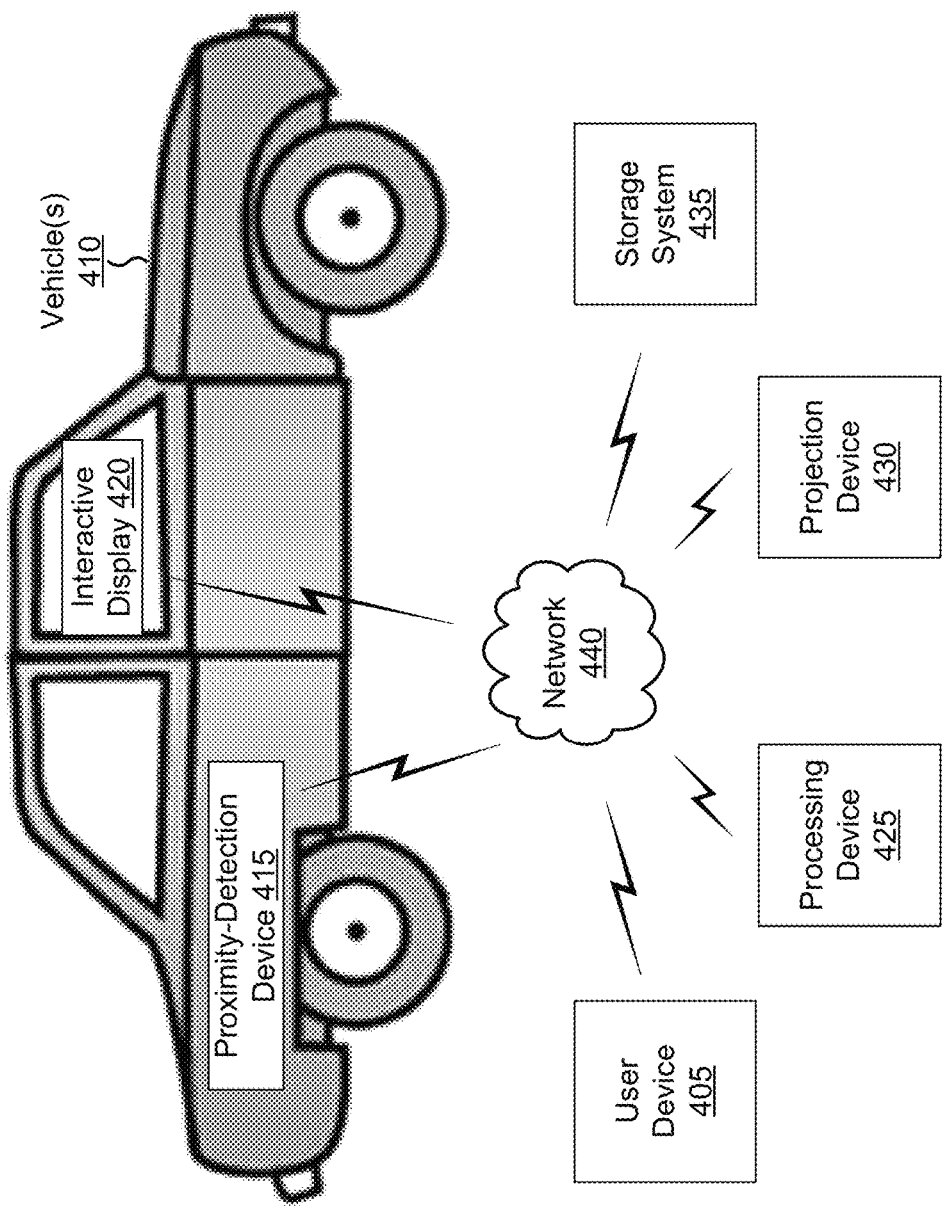
FIG. 4 is a diagram of an example environment in which systems and/or methods, described herein, may be implemented.

FIG. 4 is a diagram of an example environment 400 in which systems and/or methods, described herein, may be implemented. As shown in FIG. 4, environment 400 may include a user device 405, a vehicle 410, a proximity-detection device 415, an interactive display system 420, a processing device 425, a projection device 430, a storage system 435, and a network 440. Devices of environment 400 may interconnect via wired connections, wireless connections, or a combination of wired and wireless connections.

User device 405 includes one or more devices capable of receiving, generating, storing, processing, and/or providing information associated with a user and/or a comparison profile of the user. Additionally, or alternatively, user device 405 includes one or more devices capable of communicating with a proximity-detection device 415 associated with a vehicle 410. For example, user device 405 may include a mobile device, a mobile phone (e.g., a smart phone and/or the like), a laptop computer, a tablet computer, a handheld computer, a gaming device, a wearable communication device (e.g., a smart wristwatch, a pair of smart eyeglasses, etc.), or a similar type of device.

Vehicle 410 includes any type of vehicle for which a comparison may be sought. For example, vehicle 410 may include an automobile, a car, a truck, a motorcycle, a scooter, a boat, an airplane, a bicycle, and/or the like. As indicated elsewhere herein, although some operations are described herein in connection with vehicles, such operations may be performed in connection with other objects, such as appliances (e.g., home appliances, office appliances, and/or the like), furniture, electronics, and/or the like.

Proximity-detection device 415 includes one or more devices capable of sensing a nearby user and/or user device 405, and/or one or more devices capable of communicating with nearby devices (e.g., user device 405). For example, proximity-detection device 415 may include one or more sensors, a communication device, a PAN device (e.g., a Bluetooth device, a BLE device, and/or the like), an NFC device, an RFID device, a local area network (LAN) device (e.g., a wireless LAN (WLAN) device), and/or the like. In some implementations, proximity-detection device 415 may be integrated into vehicle 410 (e.g., into one or more electronic and/or communication systems of vehicle 410). In some implementations, the proximity-detection device 415 may be integrated into an interactive display system 420. Additionally, or alternatively, proximity-detection device 415 may be located near a vehicle 410 or a group of vehicles 410. In some implementations, a single proximity-detection device 415 may detect proximity for a corresponding single vehicle 410 (e.g., each vehicle 410 may have its own proximity-detection device 415). In some implementations, a single proximity-detection device 415 may detect proximity for multiple vehicles 410.

Interactive display system 420 includes one or more devices capable of outputting information for display, displaying information received from another device, and/or the like. For example, interactive display system 420 may include a display device (e.g., a light-emitting diode (LED) display, an organic LED (OLED) display, a liquid crystal display (LCD), a plasma display, and/or the like), a surface on which information can be output for display (e.g., a film, a decal, and/or the like). In some implementations, interactive display system 420 may include one or more other devices described herein, such as processing device 425, projection device 430, and/or the like. In some implementations, interactive display system 420 may be integrated into vehicle 410 (e.g., into one or more display systems of vehicle 410, such as a navigation system, a dashboard display, a video presentation system, a multimedia system, and/or the like). In some implementations, interactive display system 420 may be on the vehicle 410, affixed to the vehicle 410, physically located near the vehicle 410, and/or the like. Additionally, or alternatively, interactive display system 420 may include user device 405 (e.g., which may display an augmented reality user interface that outputs information for display). In some implementations, the interactive display system 420 may be capable of detecting a user interaction with a user interface output by the interactive display system 420 (e.g., via one or more sensors).

Processing device 425 includes one or more processors capable of performing one or more operations described herein (e.g., relating to proximity-based comparison). For example, processing device 425 may include a computing device, a server, an integrated circuit, a device in a cloud computing environment, a device in a data center, and/or the like. In some implementations, processing device 425 may be integrated into vehicle 410 (e.g., into one or more electronic and/or communication systems of vehicle 410).

Projection device 430 includes one or more devices capable of projecting information for display (e.g., on a surface, on another device, and/or the like). For example, projection device 430 may include a projector (e.g., an image projector, a video projector, and/or the like), a projection system, an optical projection device, or a similar type of device.

Storage system 435 includes memory for storing information and/or one or more processors capable of interacting with the memory (e.g., to read information to the memory, write information to the memory, delete information from the memory, overwrite information in the memory, and/or the like). For example, storage system 435 may include a computer, a server, a device in a cloud computing environment, a device in a data center, and/or the like. In some implementations, storage system 435 may be associated with (e.g., owned by, accessible by, and/or the like) a seller, lessor, owner, and/or the like, of vehicle 410.

Network 440 includes one or more wired and/or wireless networks. For example, network 440 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a personal area network (PAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
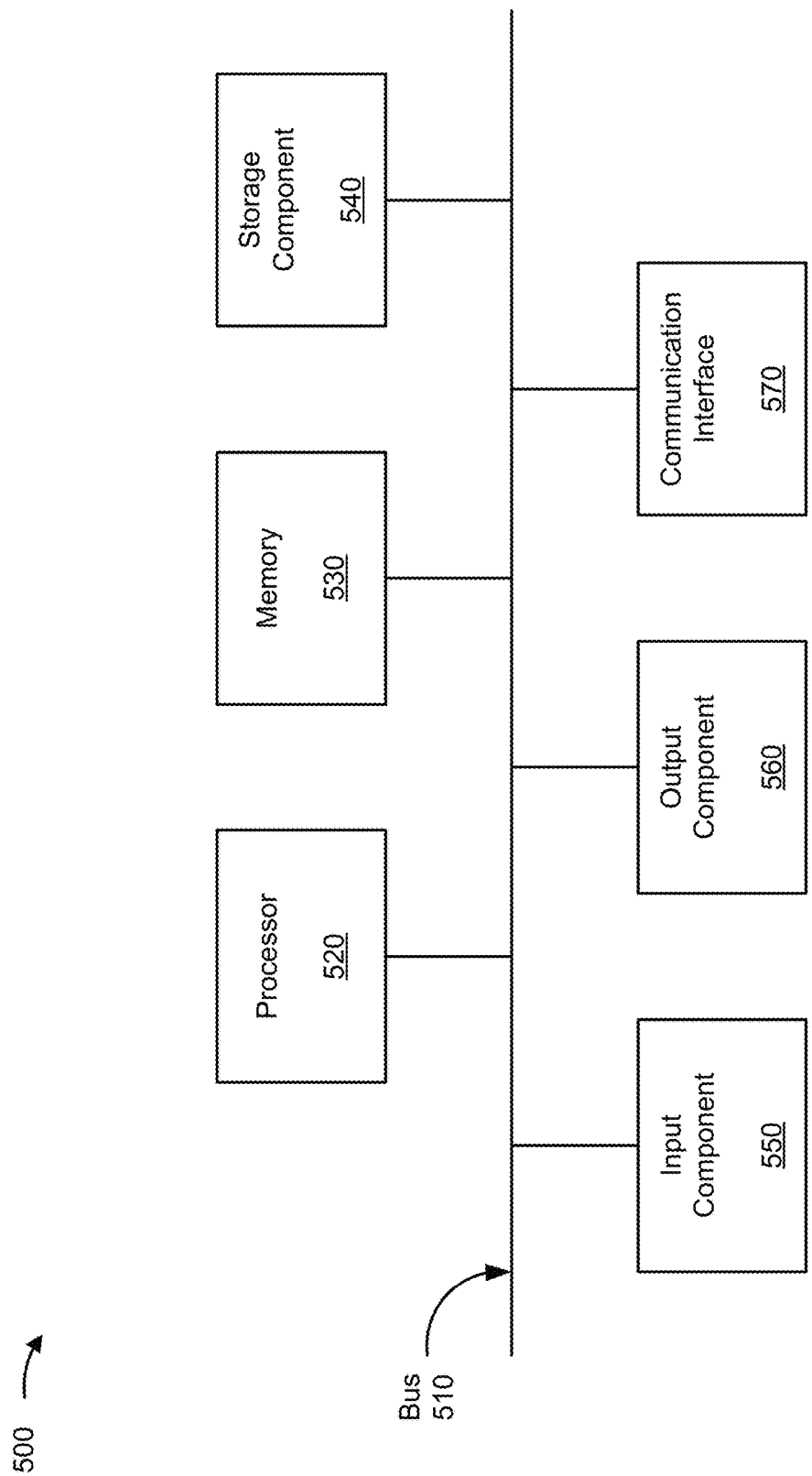
FIG. 5 is a diagram of example components of one or more devices of FIG. 4.

FIG. 5 is a diagram of example components of a device 500. Device 500 may correspond to user device 405, proximity-detection device 415, interactive display system 420, processing device 425, projection device 430, and/or storage system 435. In some implementations, user device 405, proximity-detection device 415, interactive display system 420, processing device 425, projection device 430, and/or storage system 435 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more light-emitting diodes (LEDs)).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
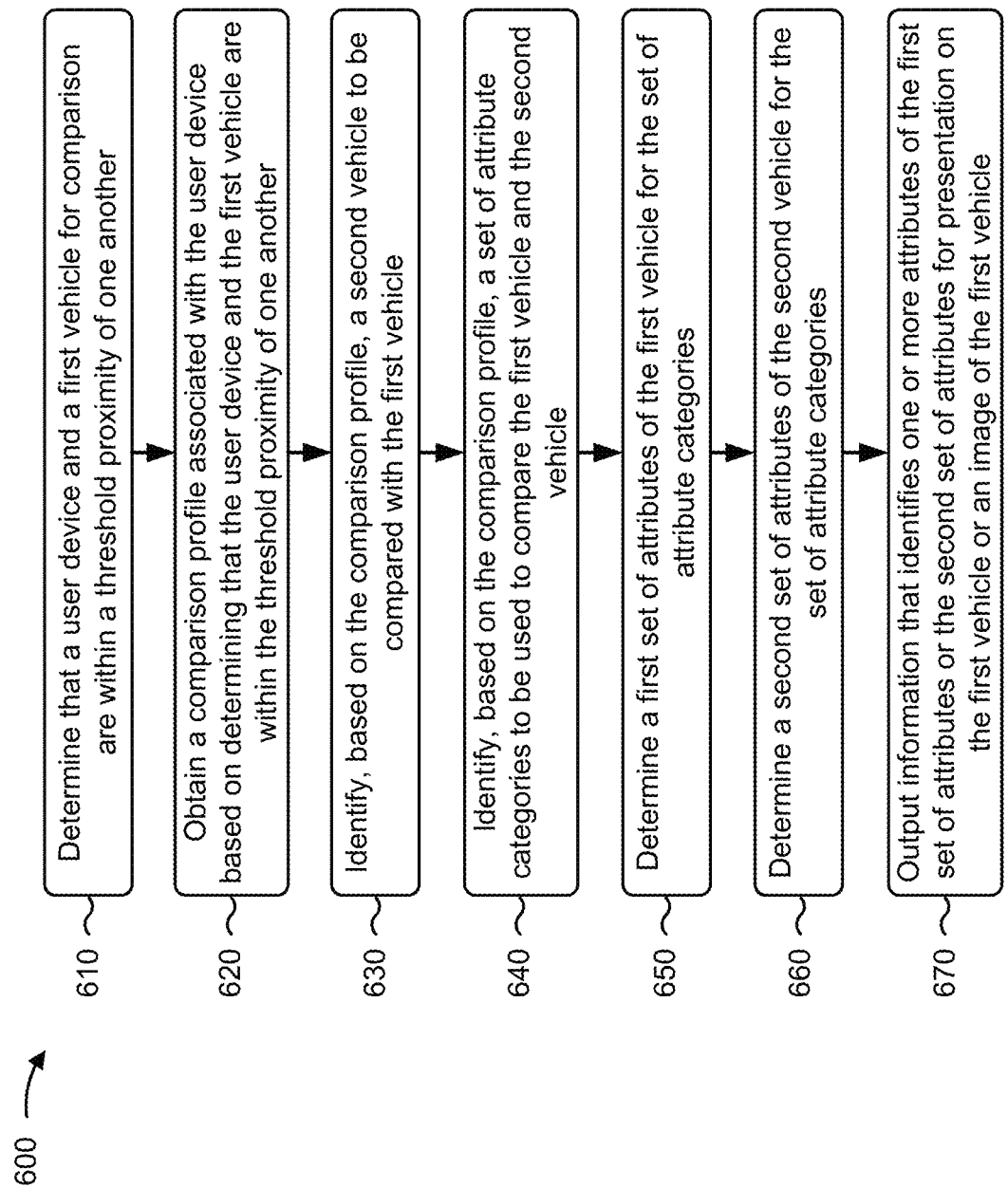
FIGS. 6-8 are flow charts of example processes for proximity-based vehicle comparison.

FIG. 6 is a flow chart of an example process 600 for proximity-based vehicle comparison. In some implementations, one or more process blocks of FIG. 6 may be performed by a processing device (e.g., processing device 425). In some implementations, one or more process blocks of FIG. 6 may be performed by another device or a group of devices separate from or including the processing device, such as a user device (e.g., user device 405), a proximity-detection device (e.g., proximity-detection device 415), an interactive display system (e.g., interactive display system 420), a projection device (e.g., projection device 430), a storage system (e.g., storage system 435), and/or the like.

As shown in FIG. 6, process 600 may include determining that a user device and a first vehicle for comparison are within a threshold proximity of one another (block 610). For example, the processing device (e.g., using processor 520, memory 530, and/or the like) may determine that a user device and a first vehicle for comparison are within a threshold proximity of one another, as described above.

As further shown in FIG. 6, process 600 may include obtaining a comparison profile associated with the user device based on determining that the user device and the first vehicle are within the threshold proximity of one another (block 620). For example, the processing device (e.g., using processor 520, memory 530, storage component 540, input component 550, communication interface 570, and/or the like) may obtain a comparison profile associated with the user device, as described above. In some implementations, the processing device may obtain the comparison profile based on determining that the user device and the first vehicle are within the threshold proximity of one another.

As further shown in FIG. 6, process 600 may include identifying, based on the comparison profile, a second vehicle to be compared with the first vehicle (block 630). For example, the processing device (e.g., using processor 520, memory 530, storage component 540, input component 550, communication interface 570, and/or the like) may identify a second vehicle to be compared with the first vehicle, as described above. In some implementations, the processing device may identify the second vehicle based on the comparison profile.

As further shown in FIG. 6, process 600 may include identifying, based on the comparison profile, a set of attribute categories to be used to compare the first vehicle and the second vehicle (block 640). For example, the processing device (e.g., using processor 520, memory 530, storage component 540, input component 550, communication interface 570, and/or the like) may identify a set of attribute categories to be used to compare the first vehicle and the second vehicle, as described above. In some implementations, the processing device may identify the set of attribute categories based on the comparison profile.

As further shown in FIG. 6, process 600 may include determining a first set of attributes of the first vehicle for the set of attribute categories (block 650). For example, the processing device (e.g., using processor 520, memory 530, storage component 540, input component 550, communication interface 570, and/or the like) may determine a first set of attributes of the first vehicle for the set of attribute categories, as described above.

As further shown in FIG. 6, process 600 may include determining a second set of attributes of the second vehicle for the set of attribute categories (block 660). For example, the processing device (e.g., using processor 520, memory 530, storage component 540, input component 550, communication interface 570, and/or the like) may determine a second set of attributes of the second vehicle for the set of attribute categories, as described above.

As further shown in FIG. 6, process 600 may include outputting information that identifies one or more attributes of the first set of attributes or the second set of attributes for presentation on the first vehicle or an image of the first vehicle (block 670). For example, the processing device (e.g., using processor 520, memory 530, output component 560, communication interface 570, and/or the like) may output information that identifies the first set of attributes and the second set of attributes for presentation on the first vehicle or an image of the first vehicle, as described above.

Process 600 may include additional aspects, such as any single aspect or any combination of aspects described below and/or in connection with one or more other processes described elsewhere herein.

In some implementations, the information that identifies the one or more attributes is projected for display on an interactive display device of the first vehicle. In some implementations, the information that identifies the one or more attributes is output for display on an augmented reality user interface by overlaying the information that identifies the one or more attributes over a captured image of the first vehicle.

In some implementations, the second vehicle is identified based on a list that identifies one or more vehicles, including the second vehicle, that are within a threshold distance of the first vehicle. In some implementations, the list is populated based on detecting the one or more vehicles that are within the threshold distance of the first vehicle.

In some implementations, process 600 includes receiving an indication to add information that identifies the first vehicle to the comparison profile; and transmitting information that identifies the first vehicle for storage in a data structure associated with the comparison profile based on receiving the indication. In some implementations, process 600 includes identifying one or more desired attributes based on the comparison profile; determining whether the first vehicle has all of the one or more desired attributes; and outputting an indication of whether the first vehicle has all of the one or more desired attributes for display. In some implementations, process 600 includes identifying one or more undesired attributes based on the comparison profile; determining whether the first vehicle has at least one undesired attribute of the one or more undesired attributes; and outputting an indication of whether the first vehicle has the at least one undesired attribute for display.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
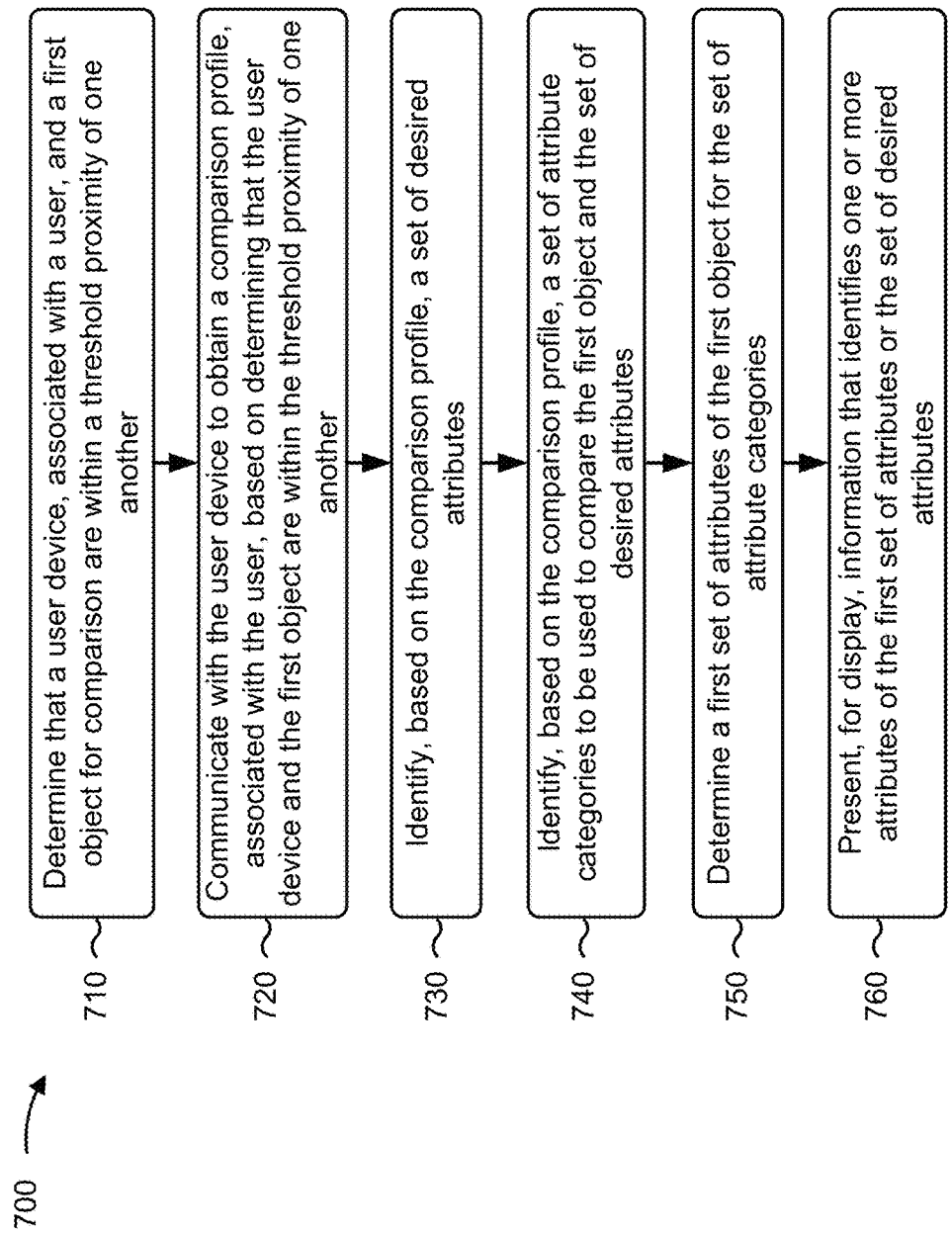

FIG. 7 is a flow chart of an example process 700 for proximity-based vehicle comparison. In some implementations, one or more process blocks of FIG. 7 may be performed by a processing device (e.g., processing device 425). In some implementations, one or more process blocks of FIG. 7 may be performed by another device or a group of devices separate from or including the processing device, such as a user device (e.g., user device 405), a proximity-detection device (e.g., proximity-detection device 415), an interactive display system (e.g., interactive display system 420), a projection device (e.g., projection device 430), a storage system (e.g., storage system 435), and/or the like.

As shown in FIG. 7, process 700 may include determining that a user device, associated with a user, and a first object for comparison are within a threshold proximity of one another (block 710). For example, the processing device (e.g., using processor 520, memory 530, storage component 540, input component 550, communication interface 570, and/or the like) may determine that a user device and a first object for comparison are within a threshold proximity of one another, as described above. In some implementations, the user device may be associated with a user.

As further shown in FIG. 7, process 700 may include communicating with the user device to obtain a comparison profile, associated with the user, based on determining that the user device and the first object are within the threshold proximity of one another (block 720). For example, the processing device (e.g., using processor 520, memory 530, communication interface 570, and/or the like) may communicate with the user device to obtain a comparison profile based on determining that the user device and the first object are within the threshold proximity of one another, as described above. In some implementations, the comparison profile may be associated with a user (e.g., the user of the user device).

As further shown in FIG. 7, process 700 may include identifying, based on the comparison profile, a set of desired attributes (block 730). For example, the processing device (e.g., using processor 520, memory 530, storage component 540, input component 550, communication interface 570, and/or the like) may identify, based on the comparison profile, a set of desired attributes, as described above.

As further shown in FIG. 7, process 700 may include identifying, based on the comparison profile, a set of attribute categories to be used to compare the first object and the set of desired attributes (block 740). For example, the processing device (e.g., using processor 520, memory 530, storage component 540, input component 550, communication interface 570, and/or the like) may identify, based on the comparison profile, a set of attribute categories to be used to compare the first object and the set of desired attributes, as described above.

As further shown in FIG. 7, process 700 may include determining a first set of attributes of the first object for the set of attribute categories (block 750). For example, the processing device (e.g., using processor 520, memory 530, storage component 540, input component 550, communication interface 570, and/or the like) may determine a first set of attributes of the first object for the set of attribute categories, as described above.

As further shown in FIG. 7, process 700 may include presenting, for display, information that identifies one or more attributes of the first set of attributes or the set of desired attributes (block 760). For example, the processing device (e.g., using processor 520, memory 530, output component 560, communication interface 570, and/or the like) may present, for display, information that identifies one or more attributes of the first set of attributes or the set of desired attributes, as described above. In some implementations, the information may be presented for display on the first object or an image of the first object.

Process 700 may include additional aspects, such as any single aspect or any combination of aspects described below and/or in connection with one or more other processes described elsewhere herein.

In some implementations, determining that the user device and the first object are within the threshold proximity of one another comprises determining that the user device and a proximity-detection device, associated with the first object, are within communicative proximity of one another. In some implementations, communicating with the user device to obtain the comparison profile comprises receiving the comparison profile from the user device, or receiving the comparison profile from a server that stores the comparison profile based on providing a credential, received from the user device, to the server.

In some implementations, the one or more attributes include at least one of: one or more attributes from the first set of attributes that match an attribute of the set of desired attributes, or one or more attributes from the first set of attributes that do not match any attributes of the set of desired attributes. In some implementations, presenting the information that identifies the one or more attributes comprises presenting the information that identifies the one or more attributes on an augmented reality user interface by overlaying the information that identifies the one or more attributes over a portion of an image of the first object.

In some implementations, process 700 includes identifying a second object based on the comparison profile or the set of desired attributes; determining a second set of attributes of the second object for the set of attribute categories; and presenting information that identifies one or more attributes of the second set of attributes.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
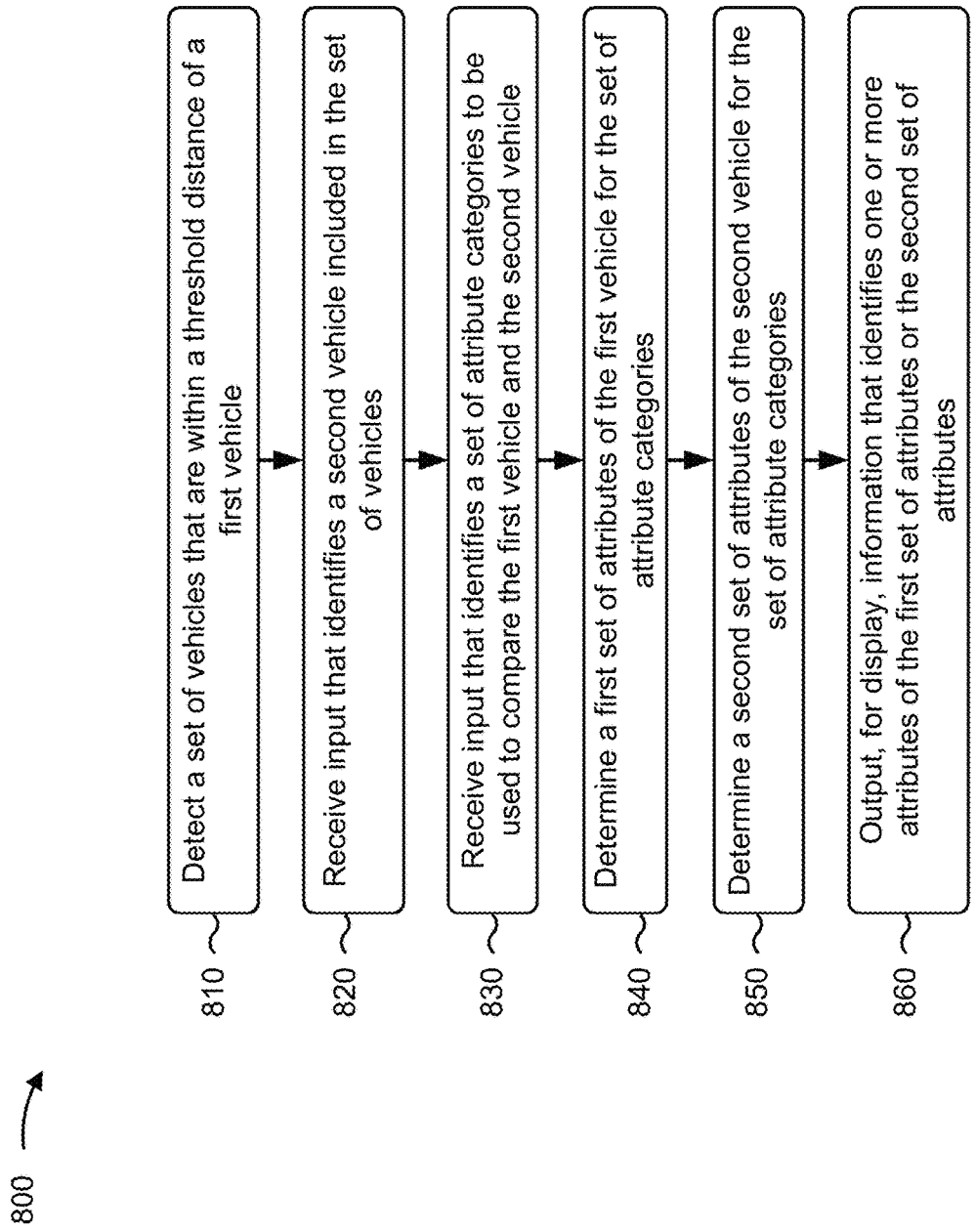

FIG. 8 is a flow chart of an example process 800 for proximity-based vehicle comparison. In some implementations, one or more process blocks of FIG. 8 may be performed by an interactive display system (e.g., interactive display system 420). In some implementations, one or more process blocks of FIG. 8 may be performed by another device or a group of devices separate from or including the interactive display system, such as a user device (e.g., user device 405), a proximity-detection device (e.g., proximity-detection device 415), a processing device (e.g., processing device 425), a projection device (e.g., projection device 430), a storage system (e.g., storage system 435), and/or the like.

As shown in FIG. 8, process 800 may include detecting a set of vehicles that are within a threshold distance of a first vehicle (block 810). For example, the interactive display system (e.g., using processor 520, memory 530, storage component 540, input component 550, communication interface 570, and/or the like) may detect a set of vehicles that are within a threshold distance of a first vehicle, as described above.

As shown in FIG. 8, process 800 may include receiving input that identifies a second vehicle included in the set of vehicles (block 820). For example, the interactive display system (e.g., using processor 520, memory 530, storage component 540, input component 550, communication interface 570, and/or the like) may receive input that identifies a second vehicle included in the set of vehicles, as described above.

As shown in FIG. 8, process 800 may include receiving input that identifies a set of attribute categories to be used to compare the first vehicle and the second vehicle (block 830). For example, the interactive display system (e.g., using processor 520, memory 530, storage component 540, input component 550, communication interface 570, and/or the like) may receive input that identifies a set of attribute categories to be used to compare the first vehicle and the second vehicle, as described above.

As shown in FIG. 8, process 800 may include determining a first set of attributes of the first vehicle for the set of attribute categories (block 840). For example, the interactive display system (e.g., using processor 520, memory 530, storage component 540, input component 550, communication interface 570, and/or the like) may determine a first set of attributes of the first vehicle for the set of attribute categories, as described above.

As shown in FIG. 8, process 800 may include determining a second set of attributes of the second vehicle for the set of attribute categories (block 850). For example, the interactive display system (e.g., using processor 520, memory 530, storage component 540, input component 550, communication interface 570, and/or the like) may determine a second set of attributes of the second vehicle for the set of attribute categories, as described above.

As shown in FIG. 8, process 800 may include outputting, for display, information that identifies one or more attributes of the first set of attributes or the second set of attributes (block 860). For example, the interactive display system (e.g., using processor 520, memory 530, storage component 540, output component 560, communication interface 570, and/or the like) may output, for display, information that identifies one or more attributes of the first set of attributes or the second set of attributes, as described above.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

In some implementations, process 800 includes outputting, for display, a set of vehicle identifiers that identify the set of vehicles; and receiving the input that identifies the second vehicle based on detecting an interaction with a vehicle identifier, of the set of vehicle identifiers, associated with the second vehicle. In some implementations, receiving the input that identifies the second vehicle comprises determining that a user device is within communicative proximity of the display system; communicating with the user device to obtain a comparison profile based on determining that the user device is within communicative proximity of the display system; and identifying the second vehicle using the comparison profile. In some implementations, receiving the input that identifies the set of attribute categories comprises identifying the set of attribute categories using the comparison profile.

In some implementations, process 800 includes detecting an interaction with the display system indicating that the comparison profile is to be updated to replace information that identifies the second vehicle with information that identifies the first vehicle; and transmitting an instruction to update the comparison profile to replace the information that identifies the second vehicle with the information that identifies the first vehicle based on detecting the interaction. In some implementations, at least one of the second vehicle or the set of attribute categories are identified based on performing facial recognition of a user within proximity of the display system.

The foregoing disclosure provides illustration and description, but is not intended to be exhaustive or to limit the implementations to the precise form disclosed. Modifications and variations may be made in light of the above disclosure and/or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    determining, by a device and based on receiving a notification or an indicator from a user device or a proximity-detection device, that the user device and a first vehicle are within a threshold proximity of one another,
        wherein the proximity-detection device is associated with the first vehicle, and
        wherein the threshold proximity is based on a communicative proximity range of a wireless component of the user device;
    obtaining, by the device, from the user device or a data storage system that stores comparison profiles, and based on determining that the user device and the proximity-detection device are within the threshold proximity of one another, a comparison profile associated with the user device
        wherein the comparison profile is of the comparison profiles;
    outputting, by the device and based on the comparison profile, information that identifies at least one attribute of the first vehicle for:
        projection onto the first vehicle by a projector device, presentation on an augmented reality user interface associated with the user device, or presentation on an interactive display associated with the first vehicle;
    identifying, by the device and based on the comparison profile, a second vehicle to be compared with the first vehicle,
        wherein the second vehicle is identified based on location information that indicates the second vehicle is within a threshold distance of the first vehicle, and
        wherein the location information is stored in association with a vehicle lot associated with the first vehicle;
    identifying, by the device and based on the comparison profile, a set of attribute categories to be used to compare the first vehicle and the second vehicle;
    determining, by the device, a first set of attributes of the first vehicle for the set of attribute categories;
    determining, by the device, a second set of attributes of the second vehicle for the set of attribute categories; and
    outputting, by the device, information that identifies one or more attributes of the first set of attributes or the second set of attributes for:
        projection onto the first vehicle by the projector device, presentation on the augmented reality user interface, or presentation on the interactive display.

2. The method of claim 1, wherein the information that identifies the one or more attributes is output for display on the augmented reality user interface by overlaying the information that identifies the one or more attributes over a captured image of the first vehicle.

3. The method of claim 1, further comprising:
    receiving an indication to add information that identifies the first vehicle to the comparison profile; and
    transmitting the information that identifies the first vehicle for storage in a data structure associated with the comparison profile based on receiving the indication.

4. The method of claim 1, further comprising:
    identifying one or more desired attributes based on the comparison profile;
    determining whether the first vehicle has all of the one or more desired attributes; and
    outputting an indication of whether the first vehicle has all of the one or more desired attributes for display.

5. The method of claim 1, further comprising:
    identifying one or more undesired attributes based on the comparison profile;
    determining whether the first vehicle has at least one undesired attribute of the one or more undesired attributes; and
    outputting an indication of whether the first vehicle has the at least one undesired attribute for display.

6. The method of claim 1, wherein outputting the information that identifies the one or more attributes comprises:

outputting the information that identifies the one or more attributes for projection onto a film or decal adhered to the first vehicle; and the method further comprises:
  detecting, via the projector device, interaction with the one or more attributes; and
  updating the information projected onto the film or decal based on detecting the interaction.

7. The method of claim 1, further comprising:
  detecting an interaction associated with the information that identifies the one or more attributes of the first set of attributes or the second set of attributes;
  identifying a third vehicle, of a set of vehicles, based on the interaction; and
  outputting information that identifies at least one attribute of the third vehicle for:
    projection onto the first vehicle by the projector device,
    presentation on the augmented reality user interface, or
    presentation on the interactive display.

8. The method of claim 1, wherein identifying the second vehicle further comprises:
  determining, based on the second set of attributes and the comparison profile, a score for the second vehicle; and
  identifying the second vehicle based on the score.

9. A device, comprising:
  one or more memories; and
  one or more processors, communicatively coupled to the one or more memories, configured to:
    determine, based on receiving a notification or an indicator from a user device or a proximity-detection device, that the user device, associated with a user, and a first object are within a threshold proximity of one another,
      wherein the proximity-detection device is associated with the first object, and
      wherein the threshold proximity is based on a communicative proximity range of a wireless component of the user device;
    communicate with the user device to obtain a comparison profile, associated with the user, based on determining that the user device and the proximity-detection device are within the threshold proximity of one another;
    identify, based on the comparison profile, a set of desired attributes;
    identify, based on the comparison profile, a set of attribute categories to be used to compare the first object and the set of desired attributes;
    output, based on the comparison profile, information that identifies at least one attribute of the first object for:
      projection onto the first object by a projector device,
      presentation on an augmented reality user interface associated with the user device, or
      presentation on an interactive display associated with the first object;
    identify, based on the comparison profile, a second object from a set of objects that is populated based on location information that is stored in association with a location that stores the first object and identifies objects within the communicative proximity range of one another,
      wherein the first object is within the communicative proximity range of at least one object in the set of objects, and
      wherein the second object is within a threshold distance of the first object;
    determine a first set of attributes of the first object for the set of attribute categories;
    determine a second set of attributes of the second object for the set of attribute categories; and
    present, for display, information that identifies one or more attributes of the first set of attributes and of the second set of attributes, the information that identifies the one or more attributes being presented for display by at least one of:
      projection onto the first object by the projector device,
      presentation on the augmented reality user interface, or
      presentation on the interactive display.

10. The device of claim 9, wherein the one or more processors, when determining that the user device and the first object are within the threshold proximity of one another, are configured to:
  determine that the user device and the proximity-detection device are within another communicative proximity range of one another.

11. The device of claim 9, wherein the one or more processors, when communicating with the user device to obtain the comparison profile, are configured to:
  receive the comparison profile from the user device, or
  receive the comparison profile from a server that stores the comparison profile based on providing a credential, received from the user device, to the server.

12. The device of claim 9, wherein the one or more attributes include at least one of:
  one or more attributes from the first set of attributes that match an attribute of the set of desired attributes, or
  one or more attributes from the first set of attributes that do not match any attributes of the set of desired attributes.

13. The device of claim 9, wherein the one or more processors, when presenting the information that identifies the one or more attributes, are configured to:
  present the information that identifies the one or more attributes on the augmented reality user interface by overlaying the information that identifies the one or more attributes over a portion of an image of the first object.

14. The device of claim 9, wherein the one or more processors, when identifying the second object, are further configured to:
  identify the second object based on the set of desired attributes.

15. An interactive display system associated with a first vehicle, comprising:
  one or more memories; and
  one or more processors, coupled to the one or more memories, configured to:
    detect, based on receiving a notification or an indicator from a user device, a set of vehicles that are within a threshold distance of the first vehicle,
      wherein the set of vehicles is detected based on location information that identifies vehicles within a communicative proximity range of the interactive display system;
    determine, based on detecting the set of vehicles, that the user device is within a threshold proximity of the interactive display system,
      wherein the threshold proximity is based on the communicative proximity range;

communicate with the user device, based on determining that the user device is within the threshold proximity of the interactive display system, to obtain a comparison profile;
output, for display and based on the comparison profile, information that identifies at least one attribute of the first vehicle;
identify, based on the location information, a second vehicle, included in the set of vehicles, using the comparison profile,
    wherein the second vehicle is within another threshold distance of the first vehicle;
receive input that identifies a set of attribute categories to be used to compare the first vehicle and the second vehicle;
determine a first set of attributes of the first vehicle for the set of attribute categories;
determine a second set of attributes of the second vehicle for the set of attribute categories; and
output, for display, information that identifies one or more attributes of the first set of attributes or the second set of attributes.

16. The interactive display system of claim 15, wherein the one or more processors are configured to:
output, for display, a set of vehicle identifiers that identify the set of vehicles;
receive input that identifies a third vehicle based on detecting an interaction with a vehicle identifier, of the set of vehicle identifiers, associated with the third vehicle;
determine a third set of attributes of the third vehicle for the set of attribute categories; and
output, for display, information that identifies at least one of the second set of attributes.

17. The interactive display system of claim 15, wherein the one or more processors, when determining that the user device is within the threshold proximity of the interactive display system, are configured to:
determine that the user device is within another communicative proximity range of the interactive display system.

18. The interactive display system of claim 15, wherein the one or more processors, when receiving the input that identifies the set of attribute categories, are configured to:
identify the set of attribute categories using the comparison profile.

19. The interactive display system of claim 17, wherein the one or more processors are further configured to:
detect an interaction with the interactive display system indicating that the comparison profile is to be updated to replace information that identifies the second vehicle with information that identifies the first vehicle; and
transmit an instruction to update the comparison profile to replace the information that identifies the second vehicle with the information that identifies the first vehicle based on detecting the interaction.

20. The interactive display system of claim 15, wherein at least one of the second vehicle or the set of attribute categories are identified based on performing facial recognition of a user within proximity of the interactive display system.

\* \* \* \* \*